(12) United States Patent
Jensen et al.

(10) Patent No.: US 12,053,724 B2
(45) Date of Patent: Aug. 6, 2024

(54) OIL FILTER COMPRISING A HYDRAULIC RESISTANCE

(71) Applicant: C.C. Jensen A/S, Svendborg (DK)

(72) Inventors: Carl Aage Jensen, Svendborg (DK); Christian Hallberg Jensen, Svendborg (DK)

(73) Assignee: C.C. Jensen A/S, Svendborg (DK)

( * ) Notice: Subject to any disclaimer, the term of this patent is extended or adjusted under 35 U.S.C. 154(b) by 374 days.

(21) Appl. No.: 15/752,552

(22) PCT Filed: Aug. 15, 2016

(86) PCT No.: PCT/EP2016/069330
§ 371 (c)(1),
(2) Date: Feb. 13, 2018

(87) PCT Pub. No.: WO2017/029257
PCT Pub. Date: Feb. 23, 2017

(65) Prior Publication Data
US 2019/0022562 A1 Jan. 24, 2019

(30) Foreign Application Priority Data

Aug. 14, 2015 (EP) .................................. 15181023

(51) Int. Cl.
*B01D 29/92* (2006.01)
*B01D 29/15* (2006.01)
(Continued)

(52) U.S. Cl.
CPC ............. *B01D 29/92* (2013.01); *B01D 29/15* (2013.01); *B01D 29/33* (2013.01); *B01D 29/46* (2013.01);
(Continued)

(58) Field of Classification Search
CPC ........ B01D 29/92; B01D 29/33; B01D 29/15; B01D 35/005; B01D 35/1576; B01D 2201/291; B01D 35/153
See application file for complete search history.

(56) References Cited

U.S. PATENT DOCUMENTS 2,334,790 A * 11/1943 Roffy ..................... B01D 35/06
204/264
3,233,737 A * 2/1966 Hultgren ................ B01D 29/15
210/434
(Continued)

FOREIGN PATENT DOCUMENTS

EP   1852170 A1   11/2007
EP   2103336 A1    9/2009
(Continued)

OTHER PUBLICATIONS

International Search Report accompanying publication WO2017029257.
(Continued)

*Primary Examiner* — Benjamin M Kurtz
(74) *Attorney, Agent, or Firm* — Liang & Hennessey LLP; Brian Hennessey

(57) ABSTRACT

The present invention relates to an oil filtration unit (1) for removal of solid contaminants from contaminated oil, the oil filtration unit (1) comprising a housing (2) which comprises a housing inlet (3) adapted to receive contaminated oil from the surroundings and to release the contaminated oil to an inner opening (4) of the housing (2) at a first pressure (p1) and a housing outlet (12) adapted to release filtered oil to the surroundings, and an oil filter (6) for filtering the contaminated oil, the oil filter (6) being arranged in the inner opening (4) of the housing (2) and comprising a filter inlet defined by an outer surface (7) of the oil filter (6), an inner filter volume (8) adapted to receive filtered oil at a second pressure (p2), where the second pressure (p2) is lower than the first
(Continued)

pressure (p1), and a filter outlet inside the housing (2) providing fluid/liquid communication between the inner filter volume (8) and the housing outlet (12) in order to release the filtered oil from the inner filter volume (8), where the filter outlet comprises a hydraulic resistance providing a fluid/liquid flow restriction between the inner filter volume (8) and the housing outlet (12) in order to increase the second pressure (p2) inside the inner filter volume (8) and to release the filtered oil from the inner filter volume (8) to the housing outlet (12) at a third pressure (p3), where the third pressure (p3) is lower than the second pressure (p2).

17 Claims, 7 Drawing Sheets

(51) Int. Cl.
  *B01D 29/33*   (2006.01)
  *B01D 29/46*   (2006.01)
  *B01D 35/00*   (2006.01)
  *B01D 35/157*  (2006.01)
(52) U.S. Cl.
  CPC ....... *B01D 35/005* (2013.01); *B01D 35/1576* (2013.01); *B01D 2201/184* (2013.01); *B01D 2201/20* (2013.01); *B01D 2201/291* (2013.01)

(56) References Cited

U.S. PATENT DOCUMENTS

| | | |
|---|---|---|
| 4,196,086 A | 4/1980 | Turetsky |
| 4,276,163 A * | 6/1981 | Gordon ................ B01D 24/008 |
| | | 210/136 |
| 2007/0241040 A1 | 10/2007 | Kott |
| 2011/0005996 A1 * | 1/2011 | Jainek ................ B01D 35/153 |
| | | 210/440 |
| 2015/0014241 A1 * | 1/2015 | Wyhler ................ B01D 29/21 |
| | | 210/497.01 |

FOREIGN PATENT DOCUMENTS

| | | |
|---|---|---|
| GB | 2309175 A | 7/1997 |
| WO | 8600241 A1 | 1/1986 |
| WO | 2007149497 A2 | 12/2007 |

OTHER PUBLICATIONS

International Preliminary Examination Authority written opinion from PCT/EP2016/069330.
International Search Authority Written Opinion from PCT/EP2016/069330.
International Preliminary Report on Patentability from PCT/EP2016/069330.

* cited by examiner

OIL FILTER COMPRISING A HYDRAULIC RESISTANCE

The present invention relates to an oil filtration unit for removal of solid contaminants from contaminated oil, the oil filtration unit comprising:

a housing which comprises a housing inlet adapted to receive contaminated oil from the surroundings and to release the contaminated oil to an inner opening of the housing at a first pressure, and a housing outlet adapted to release filtered oil to the surroundings, and an oil filter for filtering the contaminated oil, the oil filter being arranged in the inner opening of the housing and comprising a filter inlet defined by an outer surface of the oil filter, an inner filter volume adapted to receive filtered oil at a second pressure, where the second pressure is lower than the first pressure, and a filter outlet inside the housing providing fluid/liquid communication between the inner filter volume and the housing outlet in order to release the filtered oil from the inner filter volume.

Furthermore, the present invention relates to an oil filter for removal of solid contaminants from contaminated oil and a method for removal of solid contaminants from contaminated oil.

Air and/or solid contaminants may be present in e.g. hydraulic oil used in various types of machinery or in lubrication oil used in e.g. gears and bearings. Air may be incorporated into the oil used in the gearbox system of a wind turbine, when the wind turbine is operating. Air may also be incorporated into oil, in e.g. a suction line, due to an unintended leakage in the line which may have arisen as a result of lack of maintenance of the line, vibrations, or a defect in the mounting of the line. The risk of an unintentional leakage arising increases with time of operation without maintenance. When filtering the oil for contaminants, the air is known to cause filtration problems.

EP 2103336 A1 relates to a method and device for removal of solid contaminants from an air-containing, contaminated oil by leading the oil to the filter inlet separating the contaminated oil in a solid phase, which is retained by the filter, and a liquid phase, which passes the filter and leaves as a filtrate through the filter outlet. An increased pressure is added on the filtrate side.

The gearbox in a wind turbine is lubricated with an oil having a relatively high viscosity. EP 2103336 A1 discloses that when the wind turbine is working, air is incorporated in the oil in amounts of typically 5 to 20 vol/vol %. These amounts of air are present as smaller and larger bubbles of free air. Typically, the oil also contains 8 to 12 vol/vol % air dissolved in the oil at atmospheric pressure. These amounts are not included in the 5 to 20 vol/vol % of air bubbles. Further, EP 2103336 A1 discloses that the incorporated air bubbles in the gearbox are agitated to form very fine bubbles giving turbid oil appearing as froth. The suspended air bubbles may have a diameter down to 1 μm.

In EP 2103336 A1 it was ascertained that the filtration problems were due to the content of air bubbles in the oil, the air bubbles thus having to be removed before the filtration.

However, especially when the air bubbles are very fine as is the case for the froth of lubrication oil with very small air bubbles from the gearbox of wind turbines, such separation of air bubbles from high viscosity oil is very troublesome and time consuming.

Providing a pressure of the filtered oil in the outlet, i.e. a back pressure, which is after the filter, ensures that all air remains dissolved in the oil. Thus, no free air bubbles are formed when the oil passes through the filter. In EP 2103336 A1, the increased back pressure was obtained by positioning a conventional back pressure valve downstream of the oil filter. It was found that the filtration efficiency was improved, when an increased back pressure was applied to the filtrate side of the filter. Without the back pressure, the pressure drop through the filter would cause the air bubbles in the oil to expand into a larger volume and maybe also release dissolved air. This expansion of air would pull solid particles to be filtered through the pores or openings of the oil filter and release already trapped solid contaminants.

However, providing a back pressure e.g. by use of a back pressure valve downstream of the oil filter, means that not only the oil filter, but also the back pressure valve have to be amended/replaced if the application, operational conditions, type of oil, viscosity, temperature etc. change. This would also require that the back pressure valve should be calibrated. Also, a defect in the back pressure would be difficult to locate as you have to control both the oil filter, the back pressure valve and the interconnecting tubing.

Thus, known systems for filtering contaminated oil by providing a back pressure are difficult and time-consuming to amend if required due to e.g. a change in operating conditions.

In accordance with the invention, there is provided an oil filtration unit for removal of solid contaminants from contaminated oil, the oil filtration unit comprising:

a housing which comprises a housing inlet adapted to receive contaminated oil from the surroundings and to release the contaminated oil to an inner opening of the housing at a first pressure, and a housing outlet adapted to release filtered oil to the surroundings, and an oil filter for filtering the contaminated oil, the oil filter being arranged in the inner opening of the housing and comprising a filter inlet defined by an outer surface of the oil filter, an inner filter volume adapted to receive filtered oil at a second pressure, where the second pressure is lower than the first pressure, and a filter outlet inside the housing providing fluid/liquid communication between the inner filter volume and the housing outlet in order to release the filtered oil from the inner filter volume, where the filter outlet comprises a hydraulic resistance providing a fluid/liquid flow restriction between the inner filter volume and the housing outlet in order to increase the second pressure inside the inner filter volume and to release the filtered oil from the inner filter volume to the housing outlet at a third pressure, where the third pressure is lower than the second pressure.

The size of the first pressure may be defined by inter alia the flow rate at which the contaminated oil is released into the inner opening of the housing, the temperature and viscosity of the contaminated oil, the porosity of the material of the oil filter, and the size of the second pressure. The size of the second pressure may be defined by inter alia the flow rate at which the filtered oil is released into the inner filter volume, the temperature and viscosity of the filtered oil, the size of the hydraulic resistance, and the size of the third pressure. The size of the third pressure may e.g. depend on whether the housing outlet is connected to e.g. a pump for returning the filtered oil to the machinery, and on the pumping rate of said pump. Increasing the size of the third pressure, may increase the size of the first and second pressure, and increasing the size of the second pressure, e.g. by increasing the size of the hydraulic resistance, may increase the size of the first pressure. Thus, the first, second and third pressure may be interrelated.

Within the present application, the term "back pressure" may be understood as the increase in the second pressure caused by the hydraulic resistance at the filter outlet compared to if the filter outlet does not comprise a hydraulic resistance.

The operating conditions of an oil filtration unit may alter in time due to a change in e.g. the type of oil used, the viscosity or temperature of the oil or a change in the amount of air contained in the oil. The alteration of the operating conditions may also be caused by a relocation of the oil filtration unit relative to the system/engine/machinery (the oil of which is to be filtered), thus inter alia resulting in changed static and/or dynamic back pressures downstream of the oil filter. Thus, providing an oil filtration unit, where the hydraulic resistance may be arranged at the filter outlet, has the advantage that the user does not have to make amendments to e.g. the housing or tubes of the oil filtration unit, but only to the oil filter in order to meet the altered operating conditions. This is easily and quickly done by replacing the oil filter with a new type of oil filter providing a different back pressure. Furthermore, as only the oil filter is amended/changed, the risk of introducing contaminants in the oil due to defaults, such as leaks, in e.g. the tubing of the oil filtration unit, is minimised. The back pressure follows the oil filter, not the housing of the oil filtration unit.

As the filter outlet comprises the hydraulic resistance, the construction of the housing of the oil filtration unit and tube leading to and from the oil filtration unit may be independent of the specific operating conditions required, such as oil type, temperature or flow, application of the oil filtration unit, back pressure etc. Therefore, the oil filtration unit may be installed at the system/engine/machinery, without initially being adjusted to the required operating conditions. Instead, an oil filter, which meets the required operating conditions, simply has to be selected.

As the filter outlet comprises the hydraulic resistance, already existing and installed oil filtration units, which do not comprise a back pressure, may be altered to comprise a back pressure without amending/redesigning the housing or e.g. the housing inlet and outlet tubes of the oil filtration unit, but simply by replacing the oil filter.

Wear on the hydraulic resistance or irregularities in the functioning of the hydraulic resistance do not have a significant and/or permanent effect as the oil filter comprises the hydraulic resistance, and the oil filter is replaced regularly, such as once a year. Furthermore, irregularities or a defect in the back pressure is easily localised and fixed as the oil filter provides both the filtering and the back pressure function, and a change of oil filter would therefore eliminate the irregularity or defect.

The contaminated oil may come from various types of machinery such as gears or bearings, e.g. of a wind turbine, and may be a lubricating oil or a hydraulic oil.

The back pressure may be at least 0.3 bar, such as at least 0.4 bar, 0.5 bar or 0.6 bar, or may be above 0.8 bar such as above 1.0 bar, 1.2 bar, and may not be more than 5 bar, or not more than 2 bar, or not more than 1.8 bar.

The pressure difference between the first pressure and the second pressure may advantageously be between 0.2 and 2.0 bar. The pressure difference between the first pressure and the third pressure may advantageously be between 2.2 and 4.0 bar.

Thus, a flexible and long-lasting solution, which is less complicated to produce, is provided.

In an embodiment, the oil filtration unit can be suitable for removal of solid contaminants from air-containing, contaminated oil.

In the present application, the term "air-containing" oil may be understood as oil comprising an amount of non-dissolved free air bubbles of at least 0.2 vol/vol %, normally appearing as froth.

Applying a back pressure on the oil filter may be advantageous as the pressure ensures that all air remains dissolved. Thus, no free air bubbles are formed when the oil passes through the oil filter.

By applying a back pressure on the filter, all air bubbles or at least a substantial part thereof is believed to be dissolved in the oil. Since an air bubble, which is subjected to sub-saturated oil, will slowly dissolve into this oil. The period, which the oil is exposed to the increase in pressure, should be of such a length that the air bubbles dissolve into the oil.

Normally, the skilled person would not provide an increased pressure on an oil filter deliberately. However, it has been surprisingly found that the filtration efficiency is substantially improved, when such increased pressure is applied.

Without applying back pressure on the oil filter, which maintains the air in a dissolved state, the pressure drop through the filter causes the air bubbles to expand to a larger volume and probably also releases dissolved air. This expansion of air tends to pull the solid particles to be filtrated through the pores or openings of the filter. In this way, a large amount of contaminating solid particles is not separated efficiently from the oil and thus remains in the filtrate. Solid contaminants trapped in the filter during filtration in conditions without air bubbles also tend to be released once air bubbles are added to the oil again.

In an embodiment, the filter outlet can comprise natural or synthetic polymer. The oil filter may also comprise natural or synthetic polymer, and the oil filter and the filter outlet may therefore comprise similar material facilitating easy and fast manufacturing. Thus, the filter outlet and/or the oil filter may comprise cellulose material.

Advantageously, the filter outlet may be produced as part of the oil filter such that the oil filter comprises said filter outlet after production, and said filter outlet and oil filter form part of the same unit.

In an embodiment, an end plate of the oil filter can comprise the filter outlet. In case the oil filter has a cylindrical shape, the inner filter volume may extend along its longitudinal axis such that one of the oil filter ends relative to the longitudinal axis may comprise the filter outlet. Thus, the filter outlet may form part of a circularly shaped end plate of the oil filter.

It is foreseen that the end plate of the oil filter may have a non-circular shape.

It is foreseen within the present invention that the filter outlet and/or the end plate of the oil filter comprising the filter outlet may comprise a non-porous material, such as a plastic material or a metal. Thus, the filter outlet may form part of a circularly shaped end plate of the oil filter, where the end plate may comprise a porous material, such as natural or synthetic polymer, or a non-porous material, such as plastic material or metal.

In an embodiment, the hydraulic resistance can comprise a valve device, a porous material or an orifice arrangement.

The valve device may comprise a spring-loaded valve arrangement and/or may as such be a check valve, a clack valve, a non-return valve or a one-way valve normally allowing a fluid to flow through in only one direction. Valve devices are advantageous as they provide a reliable and constant flow and thus a constant back pressure.

The porous material may comprise a structure and a size of the pores facilitating the filtered oil to move through it (such as by diffusion and/or flow), such that the filtered oil may be released to the housing outlet of the oil filtration unit but at the same time, the porous material may provide a back pressure on the oil filter. In case an end plate relative to the longitudinal axis of the oil filter comprises the filter outlet, the entire or at least part of said end plate may comprise the porous material. The porosity of the material of the filter outlet may be similar to or different from the porosity of the filtering material of the oil filter. In case an end plate comprises the filter outlet, at least the part of said end plate being coincident with the extension of the inner filter volume may form the filter outlet and thus comprise the desired porous material of the filter outlet. The remainder part of said end plate may either comprise a similar porous material, the filtering material of the oil filter, or a non-porous material such as a plastic or a metal.

In case an end plate of the oil filter comprises the filter outlet, the part of said end plate being coincident with the extension of the inner filter volume may comprise an orifice arrangement. The orifice arrangement may comprise one or more orifices.

Valve devices, porous material and orifice arrangements are all reliable and efficient in providing a back pressure, and are all suitable for being used in an oil filter.

In an embodiment, the porous material and/or the orifice arrangement can comprise natural or synthetic polymer.

Thus, the porous material and/or the orifice arrangement can comprise cellulose material, and may as such take part in the filtration of the oil. Having the porous material and/or orifice arrangement comprising natural or synthetic polymer, such as cellulose material, facilitates production of the oil filter as the materials required are the same for the entire oil filter, and there is no need for determining how to combine the different materials of the different elements of the oil filter which may be difficult.

In an embodiment, the orifice arrangement can comprise one or more holes.

The one or more holes may be arranged in an end plate of the oil filter in case said end plate comprises the filter outlet. Thus, the sides of the holes may comprise the material of the end plate. This would result in an easy and low-cost way of producing the holes.

In order to ensure the stability of the structure of the holes, the holes formed in the end plate may also be supported by a stable tubular structure, such as a cylinder, where the outer periphery of the stable tubular structure may be similar in size and form as the inner periphery of the holes so that the holes and the stable tubular structures fit closely. A stable tubular structure may be produced for differently shaped holes, e.g. where the cross section of the sides are many sided, square etc.

Number and size, i.e. width, diameter, cross-sectional area, of the one or more holes may depend on the required back pressure. This means that where the operating conditions require a high back pressure, a low number of holes and/or holes with a small size may be optimal, and vice versa where the operating conditions require a low back pressure. The material of the end plate may at least partly comprise a porous material, e.g. natural or synthetic polymer, or a non-porous material, e.g. a polymer or a metal. In case the end plate comprises a porous material, which allows oil to move through, the porous material may form part of the filter outlet. Thus, the back pressure may be easily and efficiently adjusted by varying the number and size of the holes and the material of the end plate.

The one or more holes may have straight and parallel edges which facilitate easy production of the holes, e.g. in case the holes are produced by drilling or cutting. The one or more holes may also have a frustoconical shape. The end with the lowest diameter may be directed towards the inner filter volume which would facilitate an effective distribution of the filtered oil after being released from the inner filter volume.

In an embodiment, the one or more holes of the orifice arrangement can be through-going.

In case an end plate of the oil filter comprises the orifice arrangement, each of the holes may extend from an inner end surface to an outer end surface of the end plate. Providing through-going holes facilitates easy production of the holes and easy identification of the number and position of the holes and thus of the back pressure if in doubt. The estimation of the size of the back pressure may also be less complicated.

In an embodiment, the one or more holes of the orifice arrangement can be blind.

In case an end plate of the oil filter comprises the orifice arrangement, the holes may extend from an outer end surface towards an inner end surface of the end plate of the oil filter without penetrating the inner end surface of said end plate, or vice versa. Said end plate may comprise a porous material through which the oil can move so that the oil can move through both the porous material and the blind hole or only through the porous material by bypassing the blind hole. However, the blind holes allow the oil to move faster through the filter outlet and thus reduces the back pressure. Thus, the porous material surrounding the holes also form part of the filter outlet. Thus, in case the end plate comprises a natural or synthetic polymer such as cellulose, the filter outlet also participates in the filtering of the oil.

The through-going and/or blind holes may have varying sizes. However, advantageously there is a symmetry in the size, type and position of said holes relative to the longitudinal axis of the oil filter and thus of the longitudinal axis of the end plate of the oil filter such that e.g. the pressure and mechanical stress are evenly distributed across the first end plate.

In an embodiment, the orifice arrangement can comprise 1, 3, 8, 10, 15, 20, 25, 30, 40 or 50 holes.

The inventors have found these numbers of holes to be particularly advantageous as these numbers facilitate that the holes may be evenly distributed across the end plate and thus across the filter outlet which result in the pressure and mechanical stress being evenly distributed at the filter outlet.

In an embodiment, an outer surface of the end plate of the oil filter can comprise grooves extending in a direction orthogonally and/or radially to a longitudinal axis of said end plate.

The outer end surface of the oil filter may comprise a combination of substantially linear and circular grooves. Said outer end surface may comprise one or more substantially linear ridges and grooves which may be arranged adjacent to each other. The linear ridges and grooves may extend orthogonally to the longitudinal axis of the oil filter. A circular groove may surround the linear ridges and grooves and may as such extend circularly/radially to the longitudinal axis of the oil filter, with a constant radius. The circular groove and the linear grooves may be level with each other. In case part of the outer end surface, e.g. at the periphery of the end plate, does not comprise ridges and grooves, the ridges may be level with said part of the outer end surface. Said linear grooves may be mutually connected via the circular groove thus facilitating distribution of the filtered oil, which has been released from the inner filter volume, so that the filtered oil may flow freely and be released through the housing outlet to the surroundings. However, it is foreseen that said linear grooves may also be mutually connected themselves. Furthermore, it is foreseen that the linear grooves may be non-linear, such as curved or extend in zigzags.

Thus, when the oil filter has been inserted into the inner opening of the housing, the outer end surface comprising the filter outlet may come into contact with an inner end surface of the housing comprising the housing outlet. As the ridges may be level with the part of the outer end surface at the periphery of the end plate, the ridges may also come into contact with the inner end surface of the housing and therefore provide support for the end plate. This may be advantageous to prevent/minimise mechanical deformation of the end plate due to the back pressure.

In an embodiment, the holes of the orifice arrangement can be arranged at one or more of the grooves of the end plate of the oil filter.

Providing the holes at the linear and circular grooves has the advantage that the filtered oil may be released directly into the grooves which distribute the filtered oil evenly from the filter outlet so that the filtered oil may flow freely and be released effectively through the housing outlet to the surroundings.

The holes may be distributed evenly in said linear and circular grooves so as to distribute pressure and mechanical stress evenly across the outer end surface of the end plate and so as to facilitate the flow of the filtered oil to the housing outlet.

The present invention further relates to an oil filter for removal of solid contaminants from contaminated oil, the oil filter comprising
  a filter inlet defined by an outer surface of the oil filter adapted to receive the contaminated oil at a first pressure,
  an inner filter volume adapted to receive filtered oil at a second pressure being lower than the first pressure, and
  a filter outlet providing fluid/liquid communication between the inner filter volume and the surroundings in order to release the filtered oil from the inner filter volume,
  where the filter outlet comprises a hydraulic resistance providing a fluid/liquid flow restriction between the inner filter volume and the surroundings in order to increase the second pressure inside the inner filter volume and to release the filtered oil from the inner filter volume at a third pressure, where the third pressure is lower than the second pressure.

The present invention further relates to a method for removal of solid contaminants from contaminated oil, the method comprising the steps of
  providing an oil filtration unit comprising a housing which comprises a housing inlet and a housing outlet,
  providing an oil filter in an inner opening of the housing, the oil filter comprising a filter inlet defined by an outer surface of the oil filter and a filter outlet,
  introducing contaminated oil from the surroundings via the housing inlet into the inner opening of the housing at a first pressure, so that the contaminated oil is exposed to the filter inlet, and is divided, when passing the oil filter, into solid contaminants retained by the oil filter and filtered oil released into an inner filter volume at a second pressure, where the second pressure is lower than the first pressure, and
  releasing the filtered oil from the inner filter volume via the filter outlet providing fluid/liquid communication between the inner filter volume and the housing outlet,
  where a hydraulic resistance providing a fluid/liquid flow restriction between the inner filter volume and the housing outlet is provided at the filter outlet in order to increase the second pressure inside the inner filter volume and to release the filtered oil from the inner filter volume to the housing outlet at a third pressure, where the third pressure is lower than the second pressure.

In an embodiment, the method can be suitable for removal of solid contaminants from air-containing, contaminated oil.

The structure and function of the oil filtration unit and the method of using it will be described in more detail below with references to exemplary embodiments shown in the drawings wherein, FIG. 1 shows an embodiment of a cross section of an oil filtration unit comprising an oil filter, seen from the side.

In the figures, the oil filter is shown describing having a cylindrical shape. However, it should be understood that other shapes of oil filters are also intended within the scope of the present invention.

Figure 1:
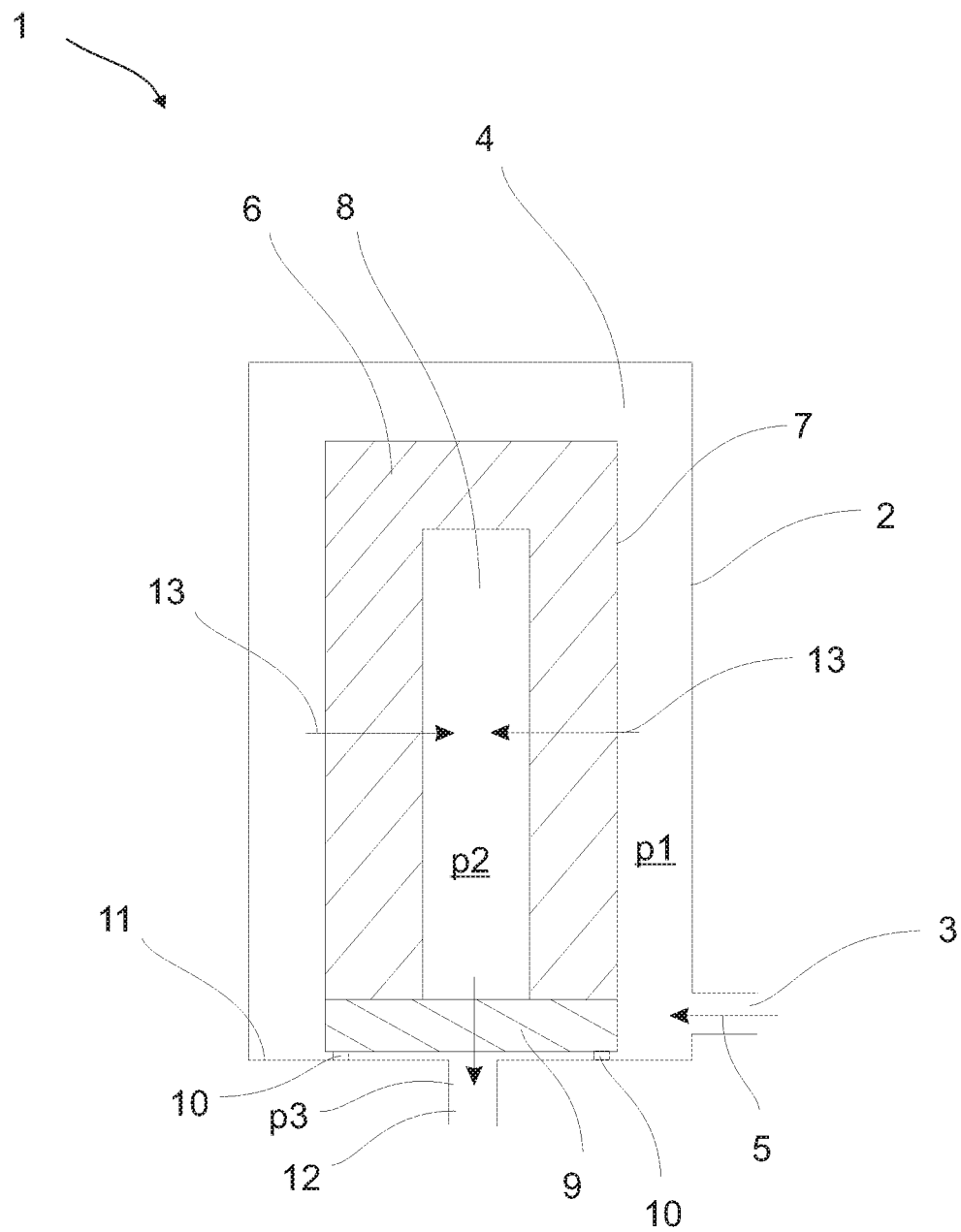

FIG. 1 shows an embodiment of a cross section of an oil filtration unit comprising a housing and an oil filter, seen from the side.

The oil filtration unit 1 may comprise a housing 2 which comprises a housing inlet 3 adapted to receive contaminated oil from the surroundings and feeding the oil at a first pressure p1 to an inner opening 4 of the housing 2 of the oil filtration unit 1 as illustrated by the arrow 5.

The oil filtration unit 1 may comprise an oil filter 6 for filtering the contaminated oil, the oil filter 6 being arranged in the inner opening 4 of the housing 2. The oil filter 6 may comprise an outer surface 7 defining a filter inlet and an inner filter volume 8 adapted to receive filtered oil at a second pressure p2. The second pressure p2 may be lower than the first pressure p1. Furthermore, the oil filter 6 may comprise a filter outlet inside the housing 2 providing fluid/liquid communication between the inner filter volume 8 and the surroundings of the oil filter 6, and the filter outlet may thus be adapted to release the filtered oil from the inner filter volume 8, where the filter outlet may be arranged at an end plate 9 of the oil filter 6.

A sealing 10 may be arranged between the end plate 9 of the oil filter 6 and an inner end surface 11 of the housing 2, as is illustrated in FIG. 1. The sealing 10 may comprise an elevation. The elevation may form a closed path and may form a circle on the inner end surface 11 of the housing 2. Thus, when the oil filter 6 is inserted into the inner opening 4 of the housing 2, the elevation may come into contact with the end plate 9 of the oil filter 6 and protrude or cut into the oil filter 6. Thus, sealing is provided between the housing 2 and the oil filter 6 resulting in the oil to be filtered being prevented from flowing directly from the housing inlet 3 to a housing outlet 12 and thus from bypassing the oil filter 6.

Instead, contaminated oil, which has been introduced into the inner opening 4 of the housing 2 and been exposed to the outer surface 7, i.e. filter inlet, of the oil filter 6, may flow through the filter inlet. During passage of the oil filter 6, as indicated by the arrows 13, the contaminated oil may be divided into solid contaminants retained by the oil filter 6 and filtered oil released into the inner filter volume 8 at a second pressure p2 being lower than the first pressure p1 due to the flow resistance through of the oil filter 6.

The filtered oil may be released from the inner filter volume 8 to the surroundings via firstly the end plate 9 comprising the filter outlet and secondly via the housing outlet 12 of the oil filtration unit 1, as illustrated by the arrow. The filter outlet may comprise a hydraulic resistance providing a fluid/liquid flow restriction between the inner filter volume 8 and the housing outlet 12 in order to increase the second pressure (p2) inside the inner filter volume 8. The hydraulic resistance results in the filtered oil being released from the inner filter volume 8 at a third pressure p3 being lower than the second pressure p2. As a consequence of a hydraulic resistance at the filter outlet, the second pressure p2 in the inner filter volume 8 is larger than would be the case if no hydraulic resistance was present at the filter outlet. Thus, a back pressure is provided which ensures that air in the oil remains dissolved and does not affect the filtration efficiency.

Figure 2:
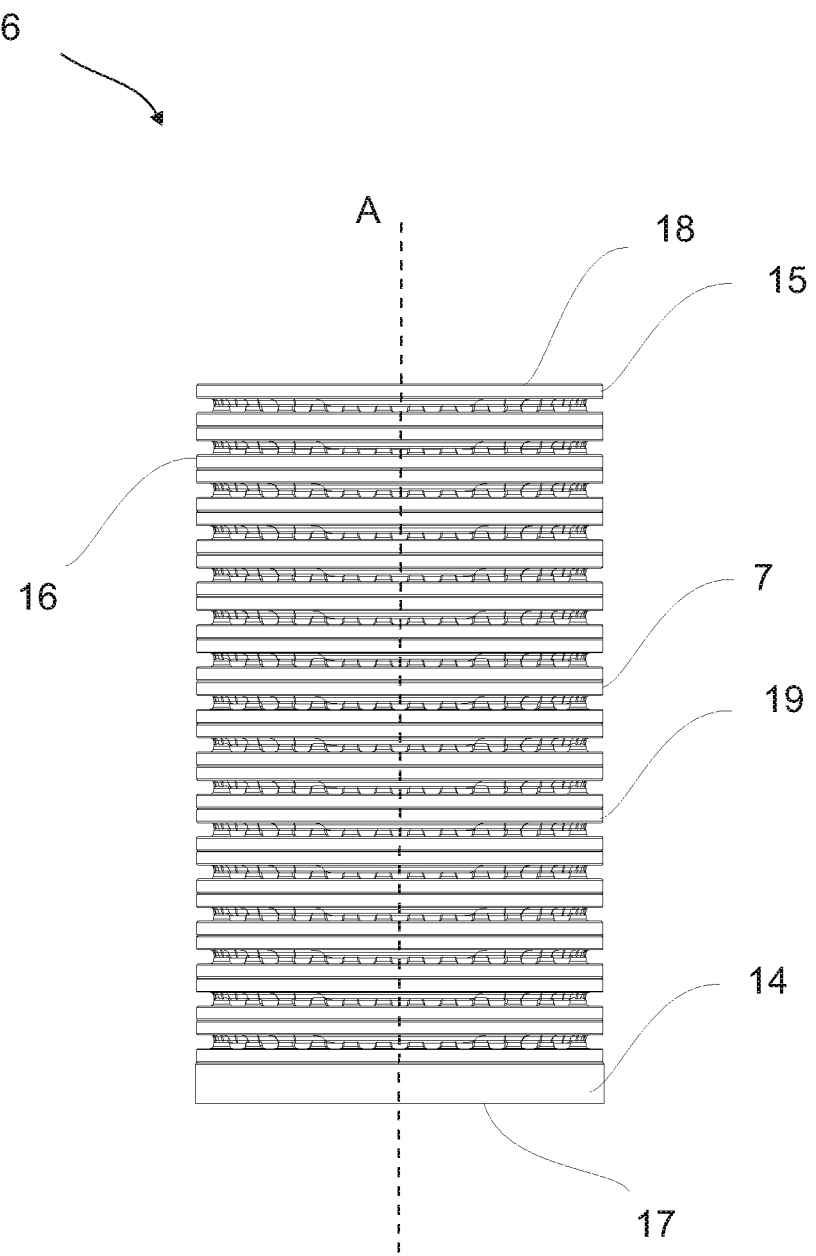
FIG. 2 shows an embodiment of an oil filter comprising a hydraulic resistance, seen from the side.

FIG. 2 shows an embodiment of an oil filter comprising a hydraulic resistance, seen from the side. For similar features, similar reference numbers have been used.

The oil filter 6 may have a substantially cylindrical shape and consist of several plates and inter alia a first 14 and a second end plate 15 and one or more centre plates 16, where the first 14 and second end plate 15 may each comprise an outer end surface 17,18, respectively. Furthermore, the oil filter 6 may comprise at least one side surface 19, where at least part of said outer end surfaces 17,18 and said at least one side surface 19 constitute the filter inlet.

In the embodiment of FIG. 2, the side surface 19 is illustrated as being uneven and comprising e.g. several grooves, but other shapes of the side surface 19, such as an even side surface 7, are foreseen within the present invention. Furthermore, it is foreseen within the present invention that the oil filter 6 may e.g. be produced in one uniform piece instead of from several plates.

The oil filter 6 may comprise a longitudinal axis A. The oil filter 6 and/or the end plate 14 of the oil filter 6 may comprise natural or synthetic polymer and may comprise a cellulose material.

Figure 3:
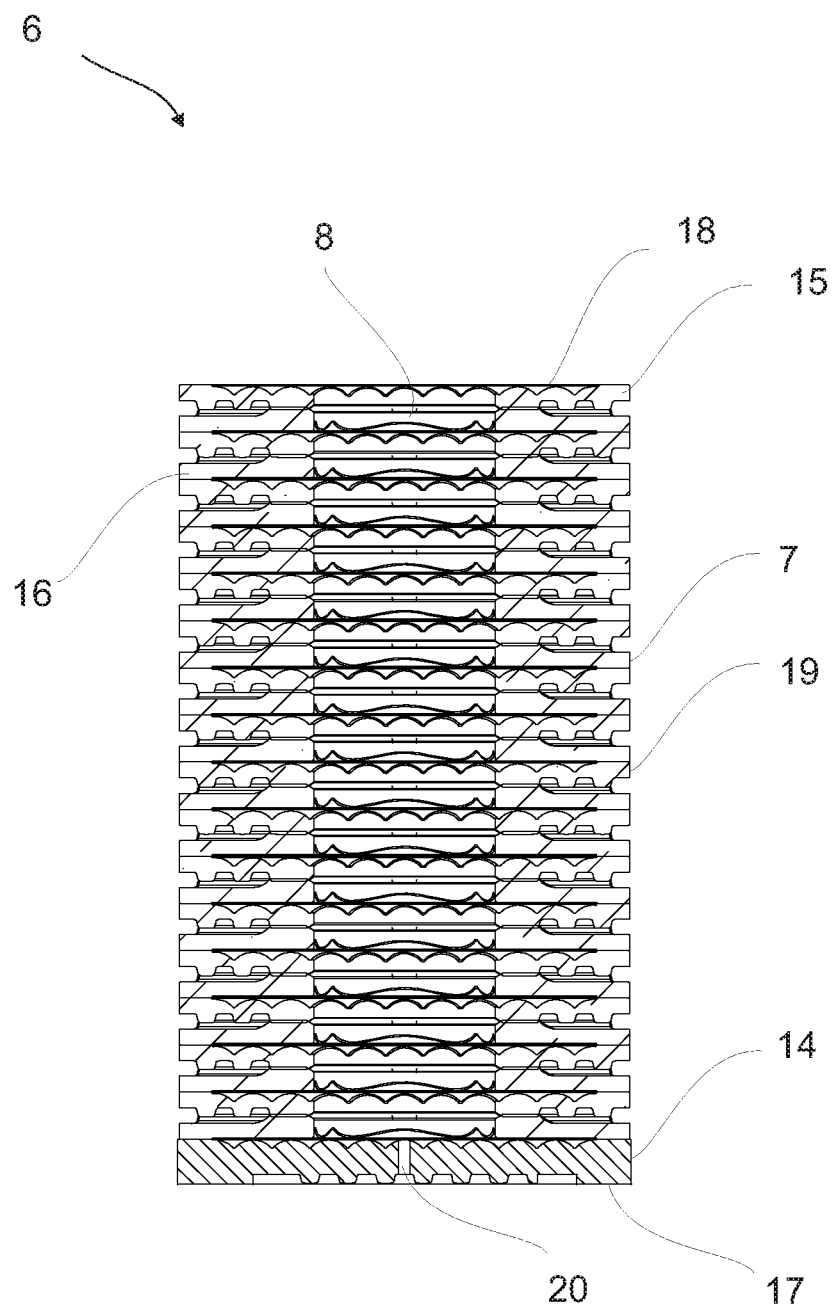
FIG. 3 shows an embodiment of a cross section of the oil filter of FIG. 2, seen along the longitudinal axis of the oil filter.

FIG. 3 shows an embodiment of a cross section of the oil filter 6 of FIG. 2, seen along the longitudinal axis A of the oil filter 6. For similar features, similar reference numbers have been used.

The oil filter 6 may comprise an inner filter volume 8 for receiving filtered oil, which has been filtered from solid contaminants retained in the filter material, when the contaminated oil moves from the inner opening 4 of the housing 2 to the inner filter volume 8.

The oil filter 6 may comprise a filter outlet comprising a hydraulic resistance adapted to release the filtered oil from the inner filter volume 8 at a third pressure p3. In FIG. 3, the first end plate 14 of the oil filter 6 is illustrated as comprising a filter outlet in the form of an orifice arrangement comprising one through-going hole 20 with a cross section being smaller than the cross section of the inner filter volume 8. However, within the present invention it is understood that other types of the hydraulic resistances are foreseen and may e.g. comprise a porous material or a valve device such as a check valve or nonreturn valve.

The size of the hydraulic resistance, which may comprise the valve device, the porous material or the orifice arrangement, depend on a number of factors such as the temperature, the viscosity of the oil, the flow of the oil through oil filter, the total cross sectional area of the holes and pores in the filter outlet and the size of the holes and pores.

In case the first end plate 14 in FIG. 3 comprises a porous material through which the oil may flow, at least part of the first end plate 14 may also form part of the filter outlet.

Figure 4:
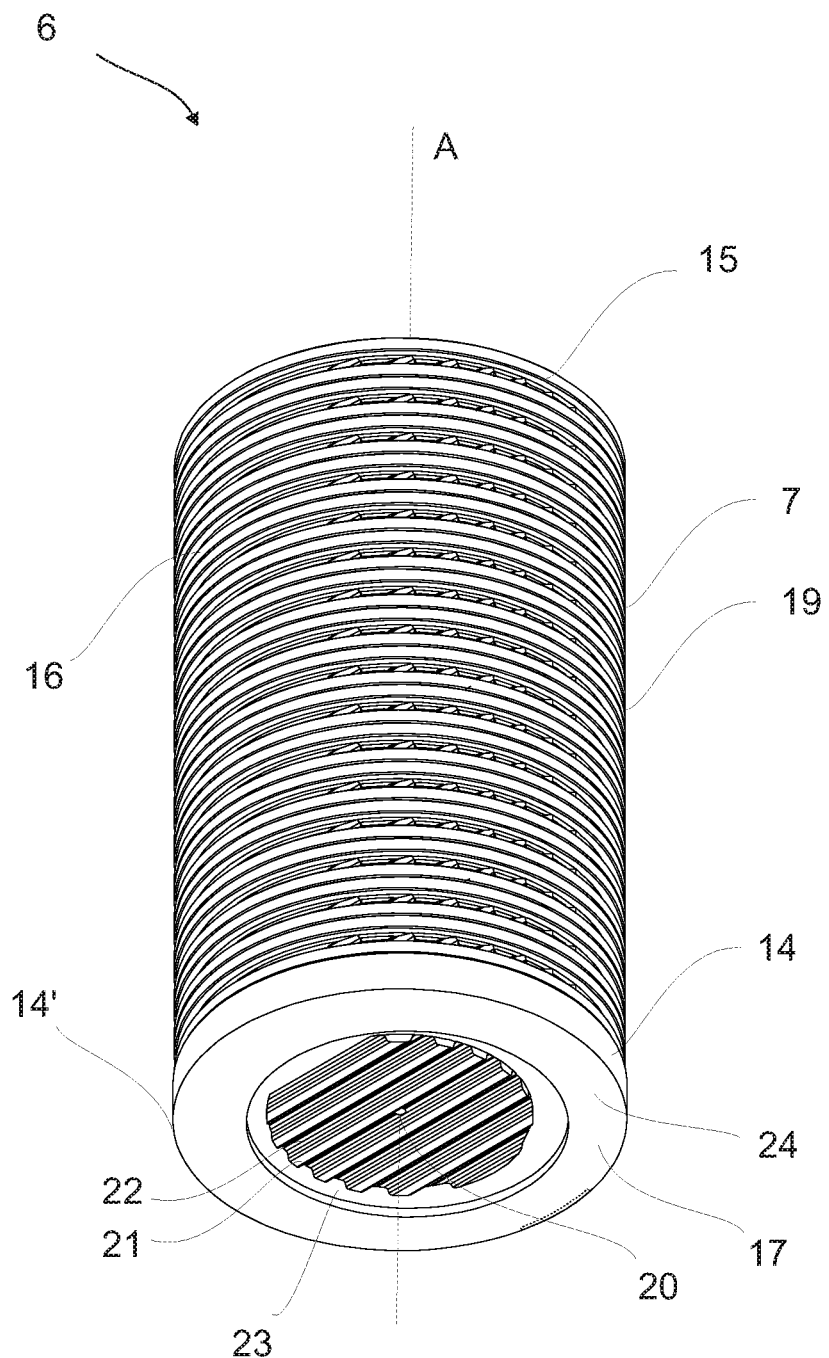
FIG. 4 shows an embodiment of a perspective view of an oil filter comprising a hydraulic resistance.

FIG. 4 shows an embodiment of a perspective view of an oil filter comprising a hydraulic resistance. For similar features, similar reference numbers have been used as in the previous Figs.

The oil filter 6 is shown as comprising a first end plate 14 comprising an outer end surface 17. The first end plate 14 may comprise a hydraulic resistance in the form of an orifice arrangement comprising one through-going hole 20.

The outer end surface 17 may comprise one or more substantially linear ridges 21 and grooves 22 which may be arranged adjacent to each other. The linear ridges 21 and grooves 22 may extend orthogonally to the longitudinal axis A of the oil filter 6. A circular groove 23 may surround the linear ridges 21 and grooves 22 and may as such extend circularly around the longitudinal axis A of the oil filter 6 with a constant radius. The circular groove 23 and the linear grooves 22 may be level with each other. The ridges 21 may be level with a part 24 of the outer end surface 17 at the periphery 14' of the end plate 14 which is illustrated as being planar in FIG. 4. Said linear grooves 22 may be mutually connected via the circular groove 23. However, it is foreseen that said linear grooves 22 may also be mutually connected themselves. Furthermore, it is foreseen that the linear grooves 22 may be non-linear, such as curved or extend in zigzags.

The through-going hole 20 may protrude the outer end surface 17 of the first end plate 14 in one of said linear 22 or circular grooves 23 and is illustrated in FIG. 4 as being positioned in one of the linear grooves 22 and may extend substantially linearly with the longitudinal axis A of the oil filter 6.

When the oil filter 6 has been inserted into the inner opening 4 of the housing 2, at least one of the outer end surfaces 17,18 may come into contact with an inner end surface of the housing 2. Thus, the outer end surface 17 of the first end plate 14 may come into contact with the inner end surface 11 of the housing 2, and as the ridges 21 may be level with the part 24 of the outer end surface 17 at the periphery 14' of the first end plate 14, the ridges 21 and said part 24 of the outer end surface 17 may come into contact with the inner end surface 11 of the housing 2. Thus, the ridges 21 may rest on said inner end surface 11 and provide support for the first end plate 14 on the inner end surface 11 which may be advantageous in order to prevent/minimise mechanical deformation of the first end plate 14 due to the difference in pressure between before (i.e. p2) and after (i.e. p3) the filter outlet.

As said linear 22 and circular grooves 23 may be mutually connected, said linear 22 and circular grooves 23 may distribute the filtered oil, which has been released from the inner filter volume 8, so that the filtered oil may flow freely and be released through the housing outlet 12 to the surroundings.

Figure 5:
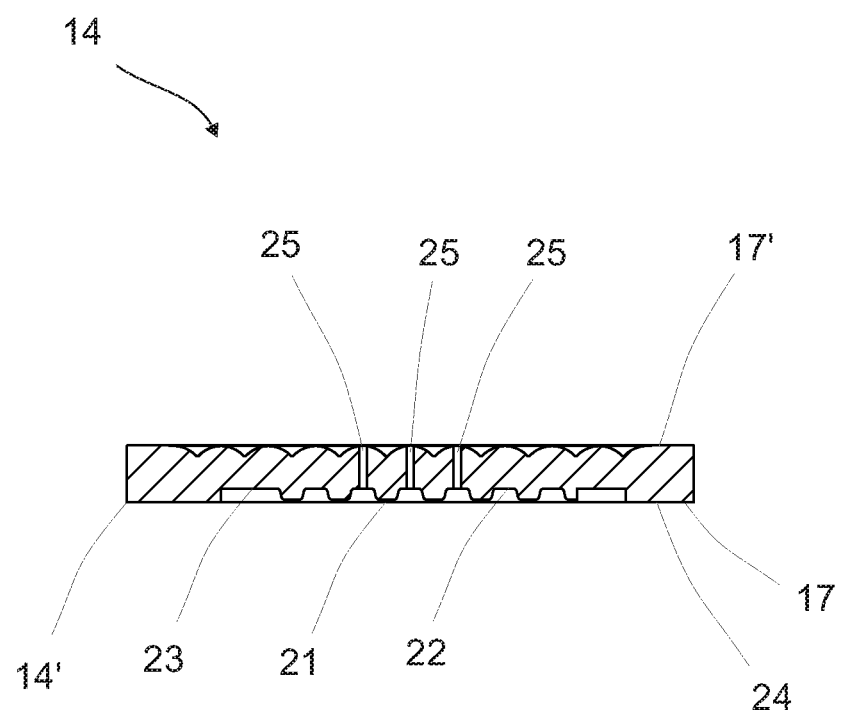
FIG. 5 shows an embodiment of a cross section of an end plate, seen along the longitudinal axis of the end plate.

FIG. 5 shows an embodiment of a cross section of an end plate, seen along the longitudinal axis of the end plate. For similar features, similar reference numbers have been used.

In the embodiment of FIG. 5, the first end plate 14 is illustrated as comprising at least three through-going holes 25 each extending from an inner end surface 17' towards the outer end surface 17 and protruding the outer end surface 17 in one of the linear grooves 22. The three through-going holes 25 may have a substantially similar size, i.e. a similar length, width and cross-sectional area.

The at least three through-going holes 25 may each be tubular with a constant radius, such as cylindrical, and/or with a constant cross-sectional area, such as a square cross section, and may be mutually parallel.

Figure 6:
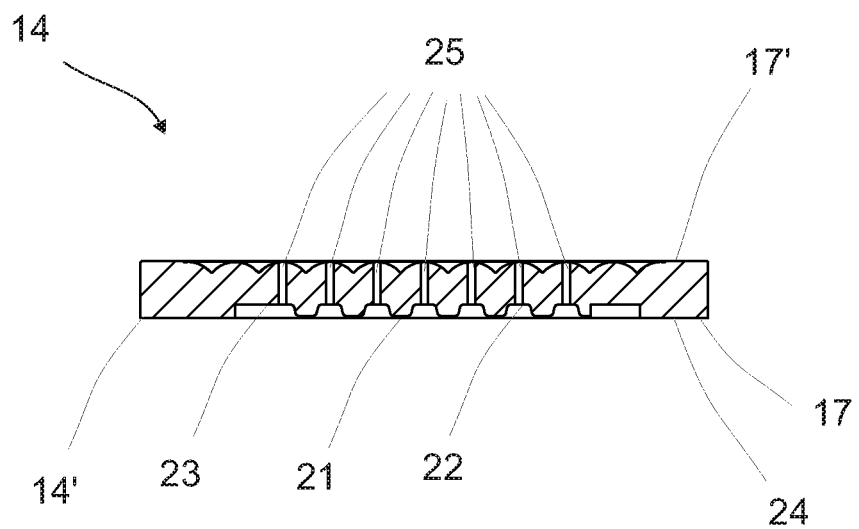
FIG. 6 shows an embodiment of a cross section of an end plate, seen along the longitudinal axis of the end plate.

FIG. 6 shows an embodiment of a cross section of an end plate, seen along the longitudinal axis of the end plate. For similar features, similar reference numbers have been used.

In the embodiment of FIG. 6, the first end plate 14 is illustrated as comprising at least seven through-going holes 25 each extending from an inner end surface 17' towards the outer end surface 17, and six of which each protrudes the outer end surface 17 in one of the linear grooves 22, and one of which protrudes the outer end surface 17 in the circular groove 23. The seven through-going holes 25 may have a substantially similar size, i.e. a similar length, width and cross-sectional area.

The at least seven through-going holes 25 may each be tubular with a constant radius, such as cylindrical, and/or with a constant cross-sectional area, such as a square cross section, and may be mutually parallel.

Figure 7:
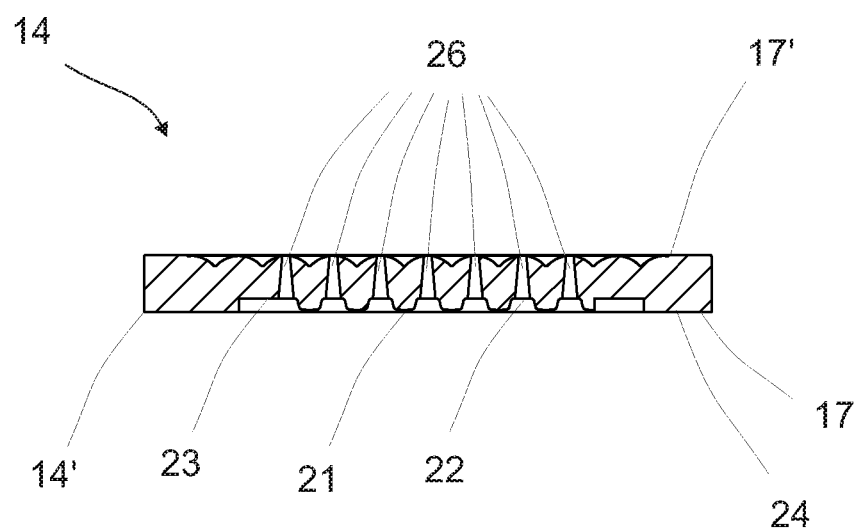
FIG. 7 shows an embodiment of a cross section of an end plate, seen along the longitudinal axis of the end plate.

FIG. 7 shows an embodiment of a cross section of an end plate, seen along the longitudinal axis of the end plate. For similar features, similar reference numbers have been used.

In the embodiment of FIG. 7, the first end plate 14 is illustrated as comprising at least seven through-going holes 26 each extending from an inner end surface 17' towards the outer end surface 17, and six of which each protrudes the outer end surface 17 in a linear groove 22, and one of which protrudes the outer end surface 17 in the circular groove 23. The seven through-going holes 25 may have a substantially similar size, i.e.

a similar length, width and cross-sectional area.

The at least seven through-going holes 26 may each be tubular with a radius varying along their length, such as frustoconical, and/or with a non-circular cross-sectional area, such as a square cross section. The radius and/or cross-sectional area may be largest downstream of the filter outlet.

Thus, as said holes 25,26 may be through-going, the first end plate 14 may comprise a non-porous material, such as e.g. a plastic or metallic material, or may comprise a porous material, such as natural or synthetic material, through which the filtered oil may move so that the first end plate 14 may form a part of the filter outlet. The material of the first end plate 14 may be chosen depending on the wanted back pressure.

Figure 8:
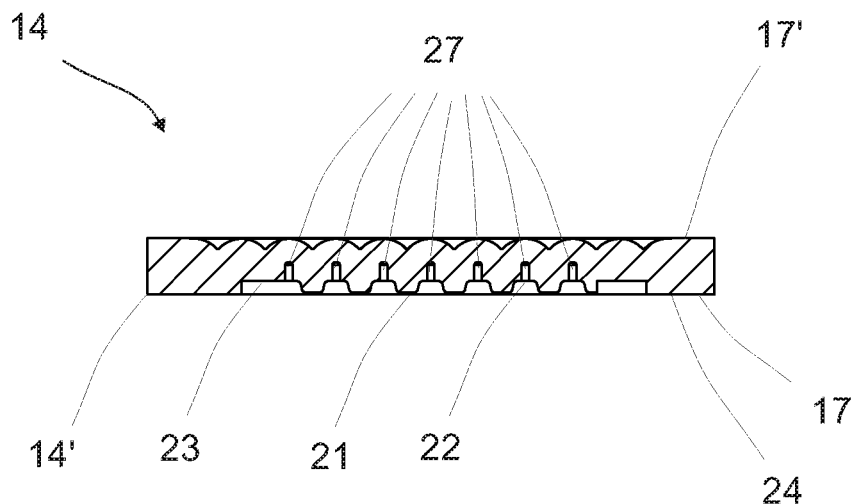
FIG. 8 shows an embodiment of a cross section of an end plate, seen along the longitudinal axis of the end plate.

FIG. 8 shows an embodiment of a cross section of an end plate, seen along the longitudinal axis of the end plate. For similar features, similar reference numbers have been used.

In the embodiment of FIG. 8, the first end plate 14 is illustrated as comprising at least seven blind holes 27, six of which each extends from a linear groove 22 towards the inner end surface 17' of the end plate 14, and one of which extends from the circular groove 23 towards the inner end surface 17'. The seven blind holes 27 may have a substantially similar size, i.e. a similar length, width and cross-sectional area.

The at least seven blind holes 27 may each be tubular with a constant radius, such as cylindrical, and/or may have a non-circular cross-section, such as a square cross section, and/or may be mutually parallel. However, it is foreseen that the at least seven blind holes 27 may also have a varying radius or cross-sectional area along their length.

Thus, in the embodiment of FIG. 8, the filtered oil may be released from the inner filter volume 8 by moving through the material of the first end plate 14 starting from the inner end surface 17' of the first end plate 14 and may flow through the at least seven blind holes 27 the remaining distance to the outer end surface 17 of the first end plate 14 when reaching said blind holes 27 in the first end plate 14. Thus, the first end plate 14 may comprise a porous material and may comprise natural or synthetic polymer so as to facilitate the movement of the filtered oil through the first end plate 14.

It is foreseen that the through-going holes 25,26 and/or blind holes 27 may have varying sizes and the number may vary. However, advantageously, there is a symmetry in the size of said holes 25,26,27 relative to the longitudinal axis A of the oil filter and thus of the longitudinal axis of the first end plate 14 such that the pressure and mechanical stress on the first end plate 14 is evenly distributed on the first end plate 14.

Letting said holes 25,26,27 protrude in the linear 22 and/or circular grooves 23 facilitates that the filtered oil is evenly distributed across the first end plate 14 after being released from the inner filter volume 8.

For example, in the case where the end plate 14 comprises three holes 25,26,27, said three holes 25,26,27 may be arranged in the three linear grooves 22 closest to the longitudinal axis of the end plate 14, or one in the linear groove 22 closest to said longitudinal axis and two in the linear grooves 22 third-closest to said longitudinal axis.

Figure 9:
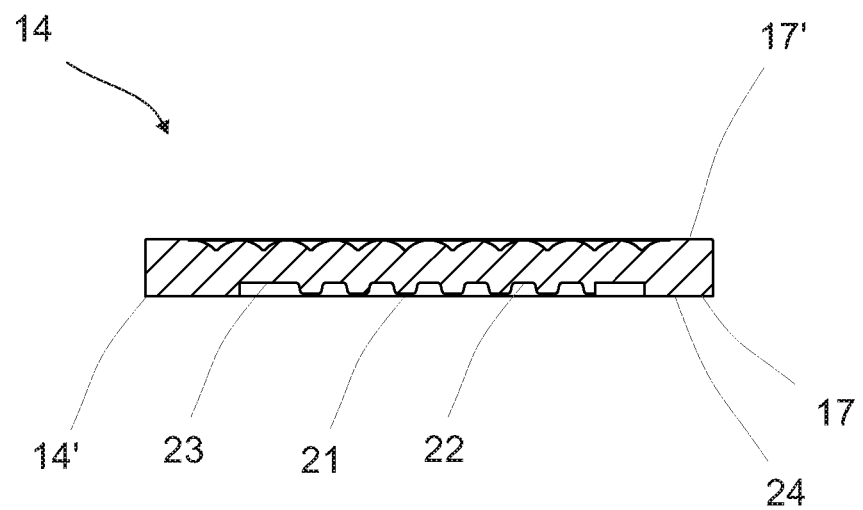
FIG. 9 shows an embodiment of a cross section of an end plate, seen along the longitudinal axis of the end plate.

FIG. 9 shows an embodiment of a cross section of an end plate, seen along the longitudinal axis of the end plate. For similar features, similar reference numbers have been used.

In the embodiment of FIG. 9, the first end plate 14 is illustrated as not comprising any holes 25,26,27. Thus, in order for the filtered oil to be released from the inner filter volume 8, the first end plate 14 may comprise a porous material so as to facilitate the movement of the filtered oil through the pores of the first end plate 14. The first end plate 14 may at least partly comprise a natural or synthetic material so that the first end plate 14 may participate in filtering the oil.

It is foreseen that the hydraulic resistance may comprise at least one valve device, such as a back pressure valve, which may be a check valve or a non-return valve, and the valve device may be spring loaded. The number of valve devices and the cracking pressure, i.e. the inlet pressure at which the first indication of flow occurs, may be determined depending of the desired back pressure.

Therefore, the filter outlet may comprise various features and have various shapes depending on e.g. the viscosity of the filtered oil, the type of oil, the flow, specific operational conditions, the desired back pressure, the air content in the oil etc.

Modifications and combinations of the above principles and designs are foreseen within the scope of the present invention.

The invention claimed is:

1. An oil filter for filtering contaminated oil, comprising:
an outer surface adapted to receive the contaminated oil at a first pressure;
an inner volume adapted to receive filtered oil at a second pressure, the second pressure being lower than the first pressure; and
an outlet contiguous with the outer surface of the oil filter providing fluid/liquid communication between the inner filter volume and a housing outlet of a housing in order to release the filtered oil from the inner volume, the outlet comprising a hydraulic resistance providing a fluid/liquid flow restriction between the inner volume and the housing outlet, the hydraulic resistance adapted to release the filtered oil from the inner volume to the housing outlet at a third pressure, the third pressure being lower than the second pressure, the hydraulic resistance generating a back pressure between 0.3 and 5 bars;
wherein the outer surface and the hydraulic resistance comprise a same material; and
wherein the outlet is adapted to contact an inner end surface of the housing when the oil filter is inserted into an inner opening of the housing.

2. An oil filter for inserting in an oil filter housing, wherein said oil filter is for filtering contaminated oil, said oil filter comprising:
an outer surface defining a filter inlet, adapted to receive the contaminated oil at a first pressure; and
an end plate defining a filter outlet and adapted to receive filtered oil from an inner volume of the oil filter at a second pressure being lower than said first pressure, the filter outlet comprising a hydraulic resistance providing a fluid/liquid flow restriction between the inner volume and a housing outlet, the hydraulic resistance adapted to release the filtered oil from the inner volume to the housing outlet at a third pressure, the hydraulic resistance generating a back pressure between 0.3 and 5 bars;
wherein the outer surface and the hydraulic resistance comprise a same material; and
wherein a surface of the end plate of the filter is adapted to contact an inner end surface of the oil filter housing when the oil filter is inserted into an inner opening of the oil filter housing.

3. An oil filter unit according to claim 2, wherein the third pressure is lower than the second pressure.

4. An oil filtration unit (1) for removal of solid contaminants from contaminated oil, the oil filtration unit (1) comprising:
a housing (2) which comprises a housing inlet (3) adapted to receive contaminated oil from the surroundings and to release the contaminated oil to an inner opening (4) of the housing (2) at a first pressure (p1) and a housing outlet (12) adapted to release filtered oil to the surroundings, and
an oil filter (6) for filtering the contaminated oil, the oil filter (6) being arranged in the inner opening (4) of the housing (2) and comprising a filter inlet defined by an outer surface (7) of the oil filter (6), an inner filter volume (8) adapted to receive filtered oil at a second pressure (p2), where the second pressure (p2) is lower than the first pressure (p1), and a filter outlet inside the housing (2) providing fluid/liquid communication between the inner filter volume (8) and the housing outlet (12) in order to release the filtered oil from the inner filter volume (8), said oil filter and said filter outlet forming a unit and being adapted to be replaceable,
characterised in that
the filter outlet comprises a hydraulic resistance forming part of the oil filter, said hydraulic resistance providing a fluid/liquid flow restriction between the inner filter volume (8) and the housing outlet (12) in order to increase the second pressure (p2) inside the inner filter volume (8) and to release the filtered oil from the inner filter volume (8) to the housing outlet (12) at a third pressure (p3), where the third pressure (p3) is lower than the second pressure (p2), the hydraulic resistance generating a back pressure between 0.3 and 5 bars,
wherein the oil filter and the hydraulic resistance comprise a same material;
wherein an end plate of the oil filter (6) comprises the filter outlet; and
wherein a surface of the end plate of the filter is adapted to contact an inner end surface of the housing when the oil filter is inserted into the inner opening of the housing.

5. An oil filtration unit (1) according to claim 4, characterised in that the oil filtration unit (1) is suitable for removal of solid contaminants from air-containing, contaminated oil.

6. An oil filtration unit (1) according to claim 4, characterised in that the filter outlet comprises natural or synthetic polymer.

7. An oil filtration unit (1) according to claim 4, characterised in that the hydraulic resistance comprises a valve device, a porous material or an orifice arrangement.

8. An oil filtration unit (1) according to claim 7, characterised in that the porous material and/or the orifice arrangement comprises natural or synthetic polymer.

9. An oil filtration unit (1) according to claim 7, characterised in that the orifice arrangement comprises one or more holes (20;25;26;27).

10. An oil filtration unit (1) according to claim 9, characterised in that the one or more holes (20;25;26) of the orifice arrangement are through-going.

11. An oil filtration unit (1) according to claim 9, characterised in that the orifice arrangement comprises 1, 3, 8, 10, 15, 20, 25, 30, 40 or 50 holes (20;25;26;27).

12. An oil filtration unit (1) according to claim 4, characterised in that an outer surface of the end plate of the oil filter (6) comprises grooves (22,23) extending in a direction orthogonally and/or radially to a longitudinal axis of said end plate.

13. An oil filtration unit (1) according to claim 12, characterised in that the orifice arrangement comprises one or more holes (20;25;26;27) and characterised in that the holes (20;25;26;27) of the orifice arrangement are arranged at one or more of the grooves (22,23) of the end plate of the oil filter (6).

14. An oil filtration unit (1) according to claim 10, characterised in that the orifice arrangement comprises 1, 3, 8, 10, 15, 20, 25, 30, 40 or 50 holes (20;25;26;27).

15. An oil filtration unit (1) according to claim 13, characterised in that the one or more holes (20;25;26) of the orifice arrangement are through-going.

16. An oil filtration unit (1) according to claim 13, characterised in that the orifice arrangement comprises 1, 3, 8, 10, 15, 20, 25, 30, 40 or 50 holes (20;25;26;27).

17. The oil filter of claim 1, wherein the back pressure is greater than 0.6 bar and less than 2.0 bar.

* * * * *